US011176650B2

(12) United States Patent
Kurita et al.

(10) Patent No.: US 11,176,650 B2
(45) Date of Patent: Nov. 16, 2021

(54) DATA GENERATION APPARATUS, DATA GENERATION METHOD, AND DATA GENERATION PROGRAM

(71) Applicant: OMRON Corporation, Kyoto (JP)

(72) Inventors: Masashi Kurita, Kizugawa (JP); Yuki Hanzawa, Nara (JP)

(73) Assignee: OMRON Corporation, Kyoto (JP)

( * ) Notice: Subject to any disclaimer, the term of this patent is extended or adjusted under 35 U.S.C. 154(b) by 173 days.

(21) Appl. No.: 16/135,018

(22) Filed: Sep. 19, 2018

(65) Prior Publication Data

US 2019/0139213 A1    May 9, 2019

(30) Foreign Application Priority Data

Nov. 8, 2017   (JP) .............................. JP2017-215452

(51) Int. Cl.
| | | |
|---|---|---|
| G06T 7/00 | (2017.01) | |
| G06K 9/62 | (2006.01) | |
| G06K 9/68 | (2006.01) | |
| G06N 20/00 | (2019.01) | |
| G06N 3/04 | (2006.01) | |

(52) U.S. Cl.
CPC .......... *G06T 7/0002* (2013.01); *G06K 9/6256* (2013.01); *G06K 9/6271* (2013.01); *G06K 9/6878* (2013.01); *G06N 20/00* (2019.01); *G06T 7/0004* (2013.01); *G06N 3/04* (2013.01); G06T 2207/10004 (2013.01); G06T 2207/20081 (2013.01); G06T 2207/30108 (2013.01)

(58) Field of Classification Search
CPC .. G06K 9/6256; G06K 9/6271; G06K 9/6878; G06N 20/00; G06N 3/04; G06T 7/0002; G06T 7/0004; G06T 2207/10004; G06T 2207/20081; G06T 2207/30108
See application file for complete search history.

(56) References Cited

U.S. PATENT DOCUMENTS

| 5,251,022 A | * | 10/1993 | Kitamura | .................. H04N 1/58 |
| | | | | 348/561 |
| 5,838,837 A | * | 11/1998 | Hirosawa | .............. G06T 3/0081 |
| | | | | 382/284 |

(Continued)

FOREIGN PATENT DOCUMENTS

| JP | 2006-163608 A | 6/2006 |
| JP | 2015-87903 A | 5/2015 |

OTHER PUBLICATIONS

John C. Russ, The Image Processing Hand book of Image third edition published in 1999, pp. 460-461. (Year: 1999).*

(Continued)

*Primary Examiner* — Mekonen T Bekele
(74) *Attorney, Agent, or Firm* — Metrolex IP Law Group, PLLC

(57) ABSTRACT

A data generation apparatus includes: an acquisition unit configured to acquire an image of an object to be inspected including a defect, and a region of the image that includes the defect; a correction unit configured to correct the region acquired by the acquisition unit by expanding an outer edge of the region so that the number of pixels included in the region is increased by a predetermined amount; and a generation unit configured to generate learning data by associating the region corrected by the correction unit with the image.

18 Claims, 8 Drawing Sheets

(56) References Cited

U.S. PATENT DOCUMENTS

| | | | |
|---|---|---|---|
| 6,476,388 B1* | 11/2002 | Nakagaki | G01N 23/225 |
| | | | 250/306 |
| 2002/0164070 A1 | 11/2002 | Kuhner et al. | |
| 2004/0080784 A1* | 4/2004 | Fujimoto | G06K 15/021 |
| | | | 358/1.15 |
| 2004/0114189 A1* | 6/2004 | Kaku | H04N 1/62 |
| | | | 358/3.26 |
| 2006/0078191 A1* | 4/2006 | Matsumura | G01N 21/8851 |
| | | | 382/149 |
| 2007/0009152 A1* | 1/2007 | Kanda | G01N 21/9501 |
| | | | 382/159 |
| 2007/0091196 A1* | 4/2007 | Miyanohara | G02B 13/08 |
| | | | 348/335 |
| 2008/0025628 A1* | 1/2008 | De Haan | G06T 5/003 |
| | | | 382/255 |
| 2009/0231639 A1* | 9/2009 | Iwayama | H04N 1/3873 |
| | | | 358/488 |
| 2011/0235906 A1* | 9/2011 | Hashimoto | H04N 1/3935 |
| | | | 382/165 |
| 2013/0170734 A1* | 7/2013 | Uchiyama | G06K 9/46 |
| | | | 382/149 |
| 2013/0258048 A1* | 10/2013 | Wang | H04N 5/23238 |
| | | | 348/38 |
| 2015/0120624 A1 | 4/2015 | Yokono et al. | |
| 2015/0181076 A1* | 6/2015 | Mita | H04N 1/00482 |
| | | | 358/1.2 |
| 2015/0189107 A1* | 7/2015 | Murata | H04N 1/387 |
| | | | 345/629 |
| 2016/0321780 A1* | 11/2016 | Guo | G06T 3/40 |
| 2017/0111582 A1* | 4/2017 | Hu | G06T 3/4038 |
| 2017/0249766 A1 | 8/2017 | Namiki et al. | |
| 2017/0309039 A1* | 10/2017 | Watanabe | G06T 7/73 |
| 2018/0014022 A1* | 1/2018 | Cho | H04N 19/103 |
| 2018/0300864 A1* | 10/2018 | Baba | G06T 7/11 |

OTHER PUBLICATIONS

Extended European search report (EESR) dated Apr. 5, 2019 in a corresponding European application.

Notice of Reasons for Refusal(Japanese Office Action = JPOA) dated May 17, 2021 in a counterpart Japanese patent application(Japan Patent Application No. 2017-215452).

* cited by examiner

DATA GENERATION APPARATUS, DATA GENERATION METHOD, AND DATA GENERATION PROGRAM

CROSS-REFERENCES TO RELATED APPLICATIONS

This application claims priority to Japanese Patent Application No. 2017-215452 filed Nov. 8, 2017, the entire contents of which are incorporated herein by reference.

FIELD

The disclosure relates to a data generation apparatus, a data generation method, and a data generation program.

BACKGROUND

In recent years, technologies for identifying images using an identification device such as a neural network have been studied. The identification device may be trained using images and data (teaching data) including labels of the images.

For the purpose of generating high quality data, an information processing apparatus is described in JP 2015-087903A that includes a classification unit that classifies a second data set serving as evaluation data with a classifier that has been trained by supervised learning using a first data set serving as the teaching data, an input unit that accepts correction of labels of the second data set according to the result of classification made by the classification unit, and an updating unit that updates the second data set so as to reflect the correction accepted by the input unit.

JP 2015-087903A is an example of background art.

SUMMARY

When it is determined with an identification device whether or not an image of the object to be inspected includes a defect, learning data in which an image including a defect is associated with the region that includes the defect may be provided as learning data for training the identification device. An identification device that has been trained using such learning data can output the region determined to include a defect in response to an image that has been input. Here, the region that includes a defect may be manually input by a person.

However, the designation of a region that includes a defect is not always performed so that it appropriately surrounds the defect. For example, the inventors have found out that, if the region is designated so as to include almost only a defect or defects, then the comparison between the defect and other portions becomes difficult, and as a result, the identification device may not appropriately identify features of the defect.

Therefore, according to an aspect, provided are a data generation apparatus, a data generation method, and a data generation program for generating learning data with which an identification device can be trained so as to appropriately identify features of a defect included in the object to be inspected based on an image.

A data generation apparatus according to an aspect of this disclosure includes: an acquisition unit configured to acquire an image of an object including a defect to be inspected, and a region of the image that includes the defect; a correction unit configured to correct the region acquired by the acquisition unit by expanding an outer edge of the region so that the number of pixels included in the region is increased by a predetermined amount; and a generation unit configured to generate learning data by associating the region corrected by the correction unit with the image. Here, the learning data includes at least image data to be input to an identification device, and data regarding the region including a defect in the image that is associated with the image data, but in general, may include image data of an object to be inspected including no defect, and data indicating that the image data includes no defect.

According to an aspect, even if a region including a defect is designated as including almost only the defect (or defects), then the region is corrected such that at least a portion of an outer edge of the region is expanded, and learning data can be generated with which an identification device can be trained so as to appropriately identify a feature of a defect included in the object to be inspected based on an image. As a result, the performance of the identification device for identifying a defect that has been trained using the learning data can be improved.

In an aspect, the correction unit may be configured to perform a plurality of different corrections on a region acquired by the acquisition unit, and the generation unit may be configured to associate, with the image, a plurality of corrected regions obtained by the correction unit performing a plurality of different corrections on the region, and generate a plurality of candidates of learning data corresponding to the plurality of different corrections performed by the correction unit.

According to an aspect, a region on which a plurality of different corrections have been performed is associated with an image, and a plurality of candidates of learning data are generated, and as a result, candidates of learning data that differ in their easiness of comparison between a defect and other portions can be generated. Here, "different correction" means that the degree of expansion of outer edge is different, for example. As a result of generating a plurality of candidates of learning data in which the degree of expansion of the outer edge is different, pieces of learning data can be generated in which the easiness of comparison between a defect and the other portion is different, and with which an identification device can be trained so as to acquire an ability to identify different features of an image portion indicating defects. Note that all of the plurality of candidates of learning data may not actually be adopted as learning data. It is sufficient that some of or all of the plurality of candidates of learning data in which the degree of expansion of the outer edge is different are selectively adopted as the actual learning data.

In an aspect, the correction unit may be configured to determine the method for correcting the region based on a background pattern of a region acquired by the acquisition unit other than the defect.

According to an aspect, the correction method can be determined such that the background pattern of the region other than the defect does not change significantly before and after correction, and learning data can be generated with which a defect included in the object to be inspected and the other portion can be appropriately compared based on the image. For example, a special pattern that is not included in a region before correction is prevented from being included in the corrected region as a result of correcting the region including a defect, and therefore learning data with which an identification device can be trained so as to appropriately compare a defect and the other portion included in an image can be generated.

In an aspect, the data generation apparatus may further include: a learning unit configured to train a plurality of identification devices that identify whether or not the object to be inspected includes a defect based on an input image, by respectively applying the plurality of candidates of learning data to train different identification devices; and a selection unit configured to select one or more pieces of learning data from the plurality of candidates of learning data, based on identification performance of a plurality of trained identification devices that have been trained by the learning unit.

According to an aspect, the generated plurality of candidates of learning data are respectively applied to train different identification devices, and one or more pieces of learning data are selected based on the identification performance of the plurality of trained identification device, and as a result, learning data with which the defect included in the object to be inspected and the other portion can be appropriately compared can be selected based on the image. Here, "different correction" means that the degree of expansion of the outer edge is different, for example. Whether or not the plurality of pieces of learning data are adopted can be determined based on identification performance of a plurality of identification devices that have been generated based on the plurality of pieces of learning data in which the degree of expansion of the outer edge is different, and as a result, an identification device can appropriately acquire the ability to distinguish the defective part, and the performance for identifying a defect can be improved.

In an aspect, the selection unit may be configured to select the one or more pieces of learning data from the plurality of candidates of learning data based on a degree of similarity between a region before correction performed by the correction unit and a region after correction performed by the correction unit. Note that the degree of similarity of the region before and after correction may be calculated using a grayscale level between black and white, or the number and strength of edges, for example.

According to an aspect, an unintended image part can be prevented from being included in a region as a result of correcting the region indicating a defect. That is, whether or not learning data is adopted can be determined such that an image part that is likely to be erroneously determined as a defect is not mixed into the learning data, and therefore learning data with which an identification device can appropriately compare a defect and the other portion included in an image can be selected.

In an aspect, the selection unit may be configured to calculate the degree of similarity based on the correlation between pixel values of pixels at an outer edge of a region before correction performed by the correction unit and pixel values of pixels at an outer edge of a region after correction performed by the correction unit.

According to an aspect, if an image part that is likely to be erroneously determined as a defect that was not included in the region before correction is included in the outer edge of the corrected region as a result of expanding the outer edge of the region, for example, this corrected region can be excluded from the learning data.

In an aspect, the acquisition unit may be configured to acquire an image of an object to be inspected including a plurality of defects, and a plurality of regions that respectively include the plurality of defects included in the image, the correction unit may be configured to correct each of the plurality of regions acquired by the acquisition unit by expanding an outer edge of the region, and the generation unit is configured to generate learning data by associating the plurality of regions corrected by the correction unit with the image.

According to an aspect, even if an image includes a plurality of defects, and a plurality of regions are designated as including almost only the respective defects, learning data with which an identification device can compare a defect and the other portion included in the image can be generated. Note that the region that includes one of the defects may be a region that is identified by the identification device to be one defect.

In an aspect, the data generation apparatus may further include an input unit configured to accept input of information to designate a region of the image that includes the defect, and the acquisition unit may be configured to acquire a region of the image that includes the defect based on information input to the input unit.

According to an aspect, an input of information that designates a region including a defect can be accepted from an operator that has confirmed an image of the object to be inspected, and the region that includes a defect can be acquired at the site of an inspection process.

In an aspect, the input unit may be configured to accept input of one or more points of the image to designate points inside a region of the image that includes the defect.

According to an aspect, as a result of letting an operator, who has confirmed an image of the object to be inspected, designate points inside the region, regardless of the shape of the defect, the operator can designate a region including a defect with a simple operation.

In an aspect, the points inside a region includes an end point of the defect included in the image.

According to an aspect, since the end point of a defect is designated and the position of the defect can be clearly set, the region that is determined based on the designation of points inside the region can be appropriately set, and learning data with which a defect included in the object to be inspected and the other portion can be appropriately compared can be obtained.

In an aspect, the input unit may be configured to accept input of one or more points of the image to designate an outer shape of a region of the image that includes the defect.

According to an aspect, as a result of letting an operator, who has confirmed an image of the object to be inspected, designate the outer shape of a region, regardless of the shape of the region, the operator can designate the region that includes a defect with a simple operation.

In an aspect, the correction unit may be configured to correct the region such that the outer edge of the region shrinks, when a predetermined condition is satisfied. Note that the predetermined condition may be a condition regarding a ratio occupied by a portion other than the defect in a region.

According to an aspect, even if the region including a defect is designated such that the portion other than the defect occupies a large part of the region, correction is performed such that at least one or more of the outer edges of the region are shrunk, and learning data with which a defect included in the object to be inspected and the other portion can be appropriately compared can be generated.

In an aspect, the correction unit may be configured to determine an enlarging/shrinking rate of the outer edge of the region based on an area ratio between the defect and the other portion included in a region acquired by the acquisition unit. The enlarging/shrinking of the outer edge of the region may be performed by comparing the area ratio between the defect included in the region and the other portion with a pre-stored appropriate rate, such that the area ratio between the defect included in the region and the other portion is the appropriate rate.

According to an aspect, if the region including a defect is designated as including almost only the defect, correction can be performed such that the outer edge of the region is expanded by a relatively large amount, and if the region is designated so as to sufficiently include a portion other than the defect, correction can be performed such that the outer edge of the region is expanded by a relatively small amount. Here, the area ratio between a defect and the other portion can be expressed by a ratio between the number of pixels indicating the defect and the number of pixels indicating the other portion.

A data generation method according to another aspect to this disclosure includes: acquiring an image of an object to be inspected including a defect, and a region of the image that includes the defect: correcting the acquired region such that an outer edge of the region is expanded so as to increase the number of pixels included in the region by a predetermined amount; and generating learning data by associating the corrected region with the image.

According to an aspect, even if the region including a defect is designated as including almost only the defect, correction is performed such that the outer edge of the region is expanded, and learning data with which an identification device can be trained such that the feature of a defect included in the object to be inspected can be appropriately identified based on an image can be generated.

A data generation program according to another aspect to this disclosure causes a computation apparatus included in a data generation apparatus to function as: an acquisition unit configured to acquire an image of an object to be inspected including a defect, and a region of the image that includes the defect; a correction unit configured to correct a region acquired by the acquisition unit by expanding an outer edge of the region so that the number of pixels included in the region is increased by a predetermined amount; and a generation unit configured to generate learning data by associating the region corrected by the correction unit with the image.

According to an aspect, even if the region including a defect is designated as including almost only the defect, correction is performed such that the outer edge of the region is expanded, and learning data with which an identification device can be trained such that the feature of a defect included in the object to be inspected can be appropriately identified based on an image can be generated.

Provided is a data generation apparatus, a data generation method, and a data generation program that generate learning data with which an identification device can be trained so as to appropriately identify the feature of a defect included in the object to be inspected based on an image.

DETAILED DESCRIPTION

Hereinafter, an embodiment according to an aspect (hereinafter, referred to as "an embodiment") will be described based on the drawings. Note that constituent elements having the same or similar configurations are denoted by the same reference signs.

1. Application Example

Figure 1:
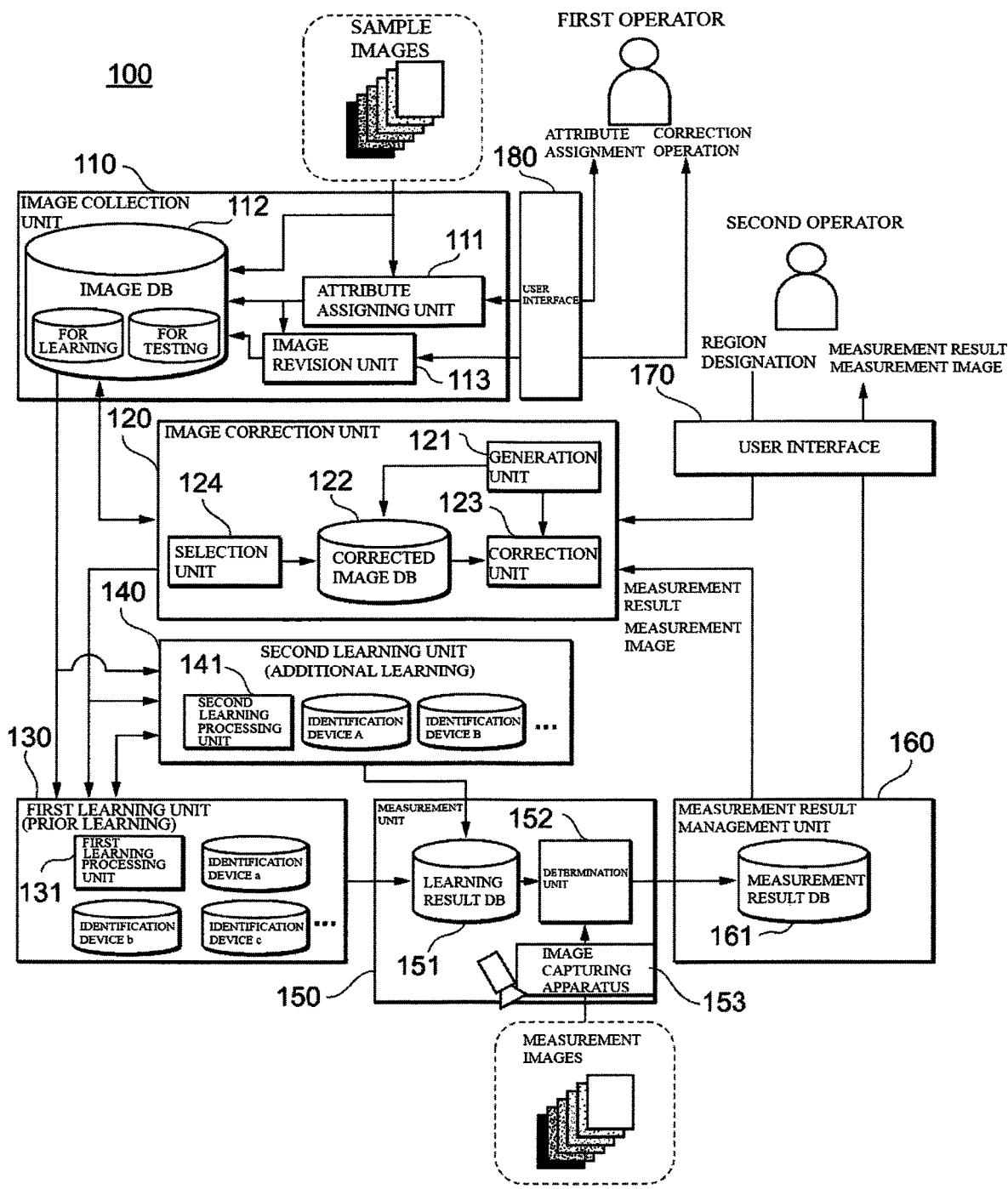
FIG. 1 is a functional block diagram illustrating a data generation apparatus according to an embodiment.

First, an example of a situation in which an aspect is applied will be described using FIG. 1. FIG. 1 is a functional block diagram schematically illustrating an example of a situation to which a data generation apparatus 100 according to an embodiment is applied. The data generation apparatus 100 according to an embodiment is an apparatus that accepts, if the image of an object to be inspected captured by an image capturing apparatus 153 includes a defect, designation of a region in which the defect is included with a user interface 170, corrects the designation by expanding the outer edge of the region, and generates new learning data by associating the corrected region with the image.

As shown in FIG. 1, the data generation apparatus 100 includes an image capturing apparatus 153 that acquires an image of the object to be inspected including a defect, a user interface 170 for acquiring a region of the image that includes the defect, a correction unit 123 that corrects the acquired region by expanding the outer edge of the region such that the number of pixels that indicate a normal part in the region is increased, and a generation unit 121 that generates learning data by associating the region corrected by the correction unit 123 with the image. Here, the image capturing apparatus 153 and the user interface 170 are examples of an "acquisition unit". In this specification, an image of the object to be inspected that is newly captured by the image capturing apparatus 153 is referred to as a "measurement image", and an image of the object to be inspected that is collected in advance for training identification devices (a, b, c, A, B . . . ) is referred to as a "sample image". Note that the data generation apparatus 100 need not include the image capturing apparatus 153, and may also acquire a measurement image from an image capturing apparatus that is provided separately.

A measurement image of the object to be inspected captured by the image capturing apparatus 153 is displayed in the user interface 170 of a second operator. The second operator designates the region, of the measurement image, that includes a defect using the user interface 170. Here, the region that includes a defect is not always designated so that it appropriately surrounds the defect. For example, the region may be designated as including almost only the defect. Conventionally, if the object itself to be recognized includes features such as a case where a human face is recognized, an identification device is trained by designating the region including only the object to be recognized. However, the defects do not necessarily include characteristic features, and there are cases where the difference between the defect and the surrounding portion is a characteristic feature. Therefore, when the region is designated as including almost only the defect, the comparison between the defect and the surrounding portion becomes difficult, and an identification device may not appropriately identify the feature of the defect. Therefore, the data generation apparatus 100 according to an embodiment does not directly associate the acquired region with the measurement image, and generates new learning data by associating a region corrected by the correction unit 123 with the measurement image.

The correction unit 123 corrects the region designated by the second operator by expanding the outer edge of the region. Also, the generation unit 121 generates learning data by associating the region corrected by the correction unit 123 with the image. The generated new learning data is stored in the corrected image DB 122, and is used to train the identification devices (a, b, c, A, B . . . ) by a first learning unit 130 and a second learning unit 140.

The inventors has found out, as a result of intensive research, when it is determined whether or not the object to be inspected includes a defect, based on an acquired image of the object to be inspected using an identification device generated based on learning data, if the learning data includes pixels indicating a normal part in addition to the pixels indicating the defect, the accuracy of identifying a defect by the identification device that has been trained using the generated learning data is improved. It seems that this is because the identification device can use, when discriminating the defective part in the image, information regarding differences between the pixels corresponding to the defective part and the pixels corresponding to the normal part. Therefore, according to the data generation apparatus 100 according to an embodiment, even if a region including a defect is designated as including almost only the defect, learning data with which an identification device can be trained such that the features of any defect included in the object to be inspected can be appropriately identified based on the image can be generated. Therefore, when learning processing is performed on an identification device, an identification device having high determination accuracy can be generated with a relatively small computation amount. Also, even if an operator does not recognize the appropriate method for designating the region in order to train the identification device, learning data that enables an appropriate comparison between the defect included in an image and the other portion can be generated.

2. Exemplary Configuration

Functional Configuration

Next, an example of a functional configuration of the data generation apparatus 100 according to an embodiment will be described using FIG. 1. The data generation apparatus 100 includes a function of generating, using learning data, an identification device that determines whether or not an object to be inspected includes a defect, and outputs, if the object to be inspected includes a defect, attribute information (label) that includes a position of the defect and a type of the defect. Here, if the object to be inspected includes a plurality of defects, the attribute information may include the fact that these defects are included, the positions of the plurality of defects, and the types of these defects. Also, the data generation apparatus 100 includes a function of acquiring a measurement image obtained by measuring the object to be inspected, and outputting attribute information of the object to be inspected using the generated identification device. Therefore, the data generation apparatus 100 functions as a data generation apparatus or an inspection system that acquires a measurement image of the object to be inspected, and, based on the measurement image, outputs a measurement result including information indicating whether or not the object to be inspected includes a defect.

As shown in FIG. 1, the data generation apparatus 100 includes an image collection unit 110 that generates and stores learning data, an image correction unit 120 that corrects a measured image (measurement image) based on information indicating correctness in the attribute information output from the identification device, a first learning unit 130 and a second learning unit 140 that generate the identification devices that output attribute information including information indicating whether or not the object to be inspected includes a defect, and, if the object to be inspected includes a defect, a position of the defect and a type of the defect, using learning data generated by at least one of the image collection unit 110 and the image correction unit 120, a measurement unit 150 that acquires a measurement image obtained by measuring an object to be inspected, and outputs attribute information of the object to be inspected using identification devices generated by at least one of the first learning unit 130 and the second learning unit 140, and a measurement result management unit 160 that stores a measurement result in which the measurement image is associated with its attribute information. Here, the measurement result includes a measurement image, and attribute information of the object to be inspected output from the identification devices. Note that the learning data is not limited to single learning data, and may be a data set that includes a set of learning data.

Here, the defect is an anomaly included in the object to be inspected, and may be a scratch, unevenness in the color or the like, contamination, a chip, burring, foreign matter, blurred printing, or printing misalignment, for example.

Also, the attribute information includes at least information indicating whether or not the image includes a defect, and if the image includes a defect, information indicating the position of the defect and information indicating the type of the defect. Note that the attribute information is not limited to information whether or not a defect is included, information indicating the position of a defect, and information indicating the type of a defect, and may also include information indicating the reliability of the information indicating whether or not a defect is included, information indicating the position of a defect, and information indicating the type of the defect that are output from the identification devices.

The data generation apparatus 100 is constituted by one or more information processing apparatuses that include a storage unit (auxiliary storage units 102 and 103 shown in FIG. 4, for example) that stores a software program and data used when the software program is executed, and a computation unit (processor 104, shown in FIG. 4, for example) that calls and executes a software program. That is, the functional blocks, namely the image collection unit 110, the image correction unit 120, the first learning unit 130, the second learning unit 140, the measurement unit 150, and the measurement result management unit 160, are realized by executing a predetermined software program stored in the storage unit such as the auxiliary storage unit 102 or 103 with the hardware processor such as the processor 104. That is, the functions of the image collection unit 110, the image correction unit 120, the first learning unit 130, second learning unit 140, the measurement unit 150, and the measurement result management unit 160 respectively indicate predetermined processing that is realized by a software program being executed by the hardware processor. Also, the image collection unit 110, the image correction unit 120, the first learning unit 130, the second learning unit 140, the measurement unit 150, and the measurement result management unit 160 are each configured as an information processing apparatus separately or together with other functional units. Note that the data generation apparatus 100 may also be configured by a single information processing apparatus. The hardware configuration of the information processing apparatus in an embodiment will be described later.

Configuration of Image Collection Unit

The image collection unit 110 acquires sample images for generating learning data. The sample images may be images obtained by capturing an object to be inspected, or CG images generated using a known image composition technology. Attribute information is assigned to each sample image collected by the image collection unit 110, or to a plurality of the images by the attribute assigning unit 111. That is, the attribute assigning unit 111 obtains learning data by assigning attribute information to the sample images.

In an embodiment, assignment of the attribute information (labeling) is performed by a first operator via a user interface 180. For example, if a sample image includes a defect, the first operator can assign attribute information that includes information indicating that a defect is included and the position of the defect by enclosing the defect with a frame having a predetermined shape, using a display apparatus (such as a liquid crystal display apparatus) and an input apparatus (such as a touch panel, a keyboard, or a mouse) serving as the user interface 180. Also, attribute information including the type of the defect can also be assigned to the sample image using the user interface 180. Note that the method of assigning the attribute information is not specifically limited. For example, attribute information may be automatically assigned to an image using an identification device that has already learned a relationship between images and attribute information to be assigned to the images, or attribute information may be assigned to clusters that are obtained by clustering a plurality of images using a known statistical method.

The images (learning data) to which respective pieces of attribute information has been assigned by the attribute assigning unit 111 are stored in an image database (hereinafter, referred to as an "image DB") 112.

The image collection unit 110 includes an image revision unit 113 that extends the learning data in accordance with the number of acquired sample images and the volume of learning data stored in the image DB 112, for example. The image revision unit 113 may extend the sample images based on a revision operation performed by the first operator via the user interface 180. Note that the image revision unit 113 is not an element that is necessarily essential to the image collection unit 110. Also, "extension of learning data" indicates processing of data augmentation for increasing the data set used for learning.

Extension (augmentation) of the learning data may be performed by translating, rotating, changing in color of, enlarging, or reducing the sample image, for example. Note that the image revision unit 113 is not a constituent element that is essential to the image collection unit 110, and may be provided as appropriate according to the amount of necessary learning data required for image measurement processing that is realized using the data generation apparatus 100.

Also, the aforementioned augmentation may be realized by an operator him/herself instructing types of processing such as extraction of a partial image or composition (combination) with a background image via any user interface 180. The learning data extended by the image revision unit 113 is stored in the image DB 112.

Here, the background image is an image to be combined with a partial image, and includes an image that is different from a measurement image from which the partial image has been extracted. Note that the background image may also be a measurement image. When a measurement image is used as the background image, the region of the measurement image at which an image is combined can be limited such that a partial image is to be combined with a region other than the region where the extracted partial image was present in the measurement image. The background image may also be generated based on an image other than the measurement image, and may or may not include the same pattern as the measurement image in a region other than the defect. Also, the background image may be any of various types of images such as an image having a uniform background pattern, an image including a hairline-like background pattern, and an image in which text and the like are printed.

The image DB 112 acquires learning data from the attribute assigning unit 111 and the image revision unit 113. The image DB 112 may store the learning data in a state in which it is classified based on the given attribute information. Also, if attribute information has already been given to a sample image acquired by the image collection unit 110, the image DB 112 may acquire and store the sample image without passing it through the attribute assigning unit 111 and the image revision unit 113. Note that, when the image DB 112 stores the learning data, the learning data may be distinguished between learning data for learning processing that is to be used in learning processing for generating a later-described identification device and test data for evaluation processing for evaluating whether or not the generated identification device outputs the desired attribute information. Of course, the learning data may also be stored in the image DB 112 without distinguishing between learning data and test data, and when learning processing is performed, the data set stored in the image DB 112 may be sorted into data for learning and data for testing using any method.

Configuration of First Learning Unit

Figure 2:
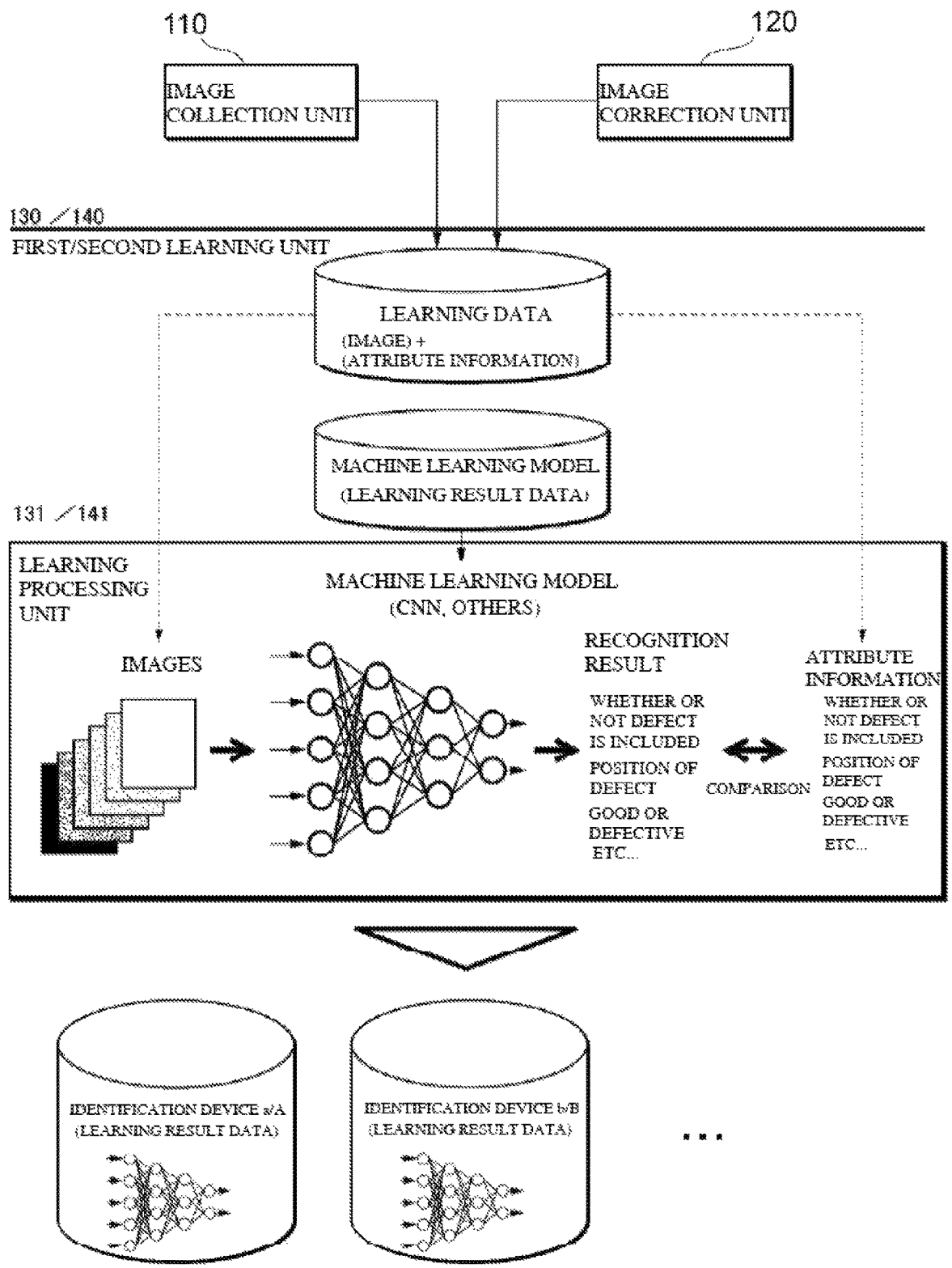
FIG. 2 is a conceptual diagram illustrating processing in a first learning unit and a second learning unit of a data generation apparatus according to an embodiment.

FIG. 2 is a conceptual diagram illustrating the processing in the first learning unit 130 and the second learning unit 140 of the data generation apparatus according to an embodiment. The first learning unit 130 acquires learning data from the image collection unit 110. Note that the first learning unit 130 may also acquire learning data from the later-described image correction unit 120. The first learning unit 130 includes a first learning processing unit 131 that executes machine learning using the acquired learning data and generates identification devices (a, b, c . . . ). The identification devices (a, b, c . . . ) receive image data as input, and output attribute information including information indicating whether or not the image includes a defect, and if one or more defects are included, the position and type of each defect. Note that data other than the image data may be input to the identification devices (a, b, c . . . ). For example, conditions (such as a light amount and an exposure time of the image capturing apparatus) with which an image of the object to be inspected has been captured or identification information of the object to be inspected may be input to the identification devices (a, b, c . . . ).

The identification devices (a, b, c, ... ) are generated by performing learning processing and evaluation processing with any machine learning model. A machine learning model is a model that includes a predetermined model structure and processing parameters that change according to the learning processing, and whose identification performance improves as a result of the processing parameters being optimized based on experience obtained from the learning data. That is, the machine learning model is a model in which optimum processing parameters are learned by learning processing. The algorithm to be used in the machine learning model may be a support vector machine, logistic regression, or a neural network, for example, but the type thereof is not specifically limited. In an embodiment, an example is described in which a convolutional neural network (Convolutional Neural Network) optimized for image recognition is used, which is an example selected from deep neural networks, which are neural networks specifically having three or more layers. Note that the first learning unit 130 may also include a model generation unit (not shown) for generating a machine learning model. Also, the first learning unit 130 may acquire a machine learning model that has been generated in advance from the outside.

The first learning processing unit 131 performs, using the learning data, learning processing for training the machine learning model so as to, when image data is input, output an output value corresponding to the attribute of the measurement image that is expressed by the attribute information. The first learning processing unit 131 further performs, using test data, evaluation processing with the identification devices (a, b, c ... ) that have been generated by the learning processing in which the outputs of the identification devices (a, b, c ... ) are compared with attribute information given to the test data. If the outputs of the identification devices (a, b, c ... ) match the attribute information given to the test data, it is determined that the conditions to generate the identification devices (a, b, c ... ) are satisfied, and processing for generating the identification devices (a, b, c ... ) is ended.

The first learning unit 130 outputs information including the model structure and the processing parameters of the generated identification devices (a, b, c ... ) to the later-described measurement unit 150 and second learning unit 140, as the learning result data.

Configuration of Second Learning Unit

Next, the processing to be performed by the second learning unit 140 will be described using FIG. 2. The second learning unit 140 performs additional training (relearning) on an identification device that has been generated by predetermined generation processing. Note that constituent elements of the second learning unit 140 that are the same as those of the first learning unit 130 will not be described.

The second learning unit 140 acquires the learning result data of the identification devices (a, b, c ... ) that have been generated and trained by the first learning unit 130. Note that the second learning unit 140 may acquire learning result data relating to an identification device that has been generated by predetermined generation processing from the outside. The second learning unit 140 acquires learning data from the image collection unit 110. Note that the second learning unit 140 may also acquire the learning data from the later-described image correction unit 120.

The second learning unit 140 includes a second learning processing unit 141 that executes additional training (relearning) by machine learning using learning data, and generates identification devices (A, B, C ... ). The identification devices (A, B, C ... ) are generated by performing learning processing and evaluation processing with the identification devices (a, b, c ... ) that have been generated by the predetermined learning processing. In other words, the second learning processing unit 141 generates the identification devices (A, B, C ... ) by executing, using learning data, learning processing and evaluation processing with the learning result data including the model structure and the processing parameters of the identification devices (a, b, c ... ). The identification devices (A, B, C ... ) receive image data as input and output attribute information including information indicating whether or not the image includes a defect, and if one or more defects are included, the position and type of each defect.

The second learning processing unit 141 performs, using learning data, learning processing (learning processing for additional training) for training a machine learning model expressed by the learning result data of the identification devices (a, b, c ... ) such that, when image data is input, an output value corresponding to an attribute of the measurement image that is expressed by the attribute information is output. Here, the learning processing of additional training performed by the second learning processing unit 141 may be performed using learning data acquired by the later-described image correction unit 120. With this, learning data that has been newly generated based on an image obtained by capturing an object to be inspected can be used, and the identification accuracy of the identification device can be improved.

The second learning processing unit 141 further subjects the identification devices (A, B, C ... ) that have been generated by the learning processing to evaluation processing in which, using test data, the outputs of the identification devices (A, B, C ... ) are compared with attribute information given to the test data. When the outputs of the identification devices (A, B, C ... ) match the attribute information given to the test data, it is determined that the conditions for generating the identification devices (A, B, C ... ) are satisfied, and the processing for generating the identification devices (A, B, C ... ) is ended. Here, the evaluation processing performed by the second learning processing unit 141 may be performed using test data acquired from the later-described image correction unit 120. With this, evaluation can be performed using learning data that has been newly generated based on an image obtained by capturing the object to be inspected, and the recognition accuracy of the identification devices can be improved.

The second learning unit 140 outputs information including the model structure and the processing parameters of the identification devices (A, B, C ... ) to the later-described measurement unit 150, as learning result data.

Note that it is also possible that the first learning unit 130 and the second learning unit 140 are configured integrally, and the first learning processing unit 131 executes the learning processing and the evaluation processing of the additional training.

Configuration of Measurement Unit

Figure 3:
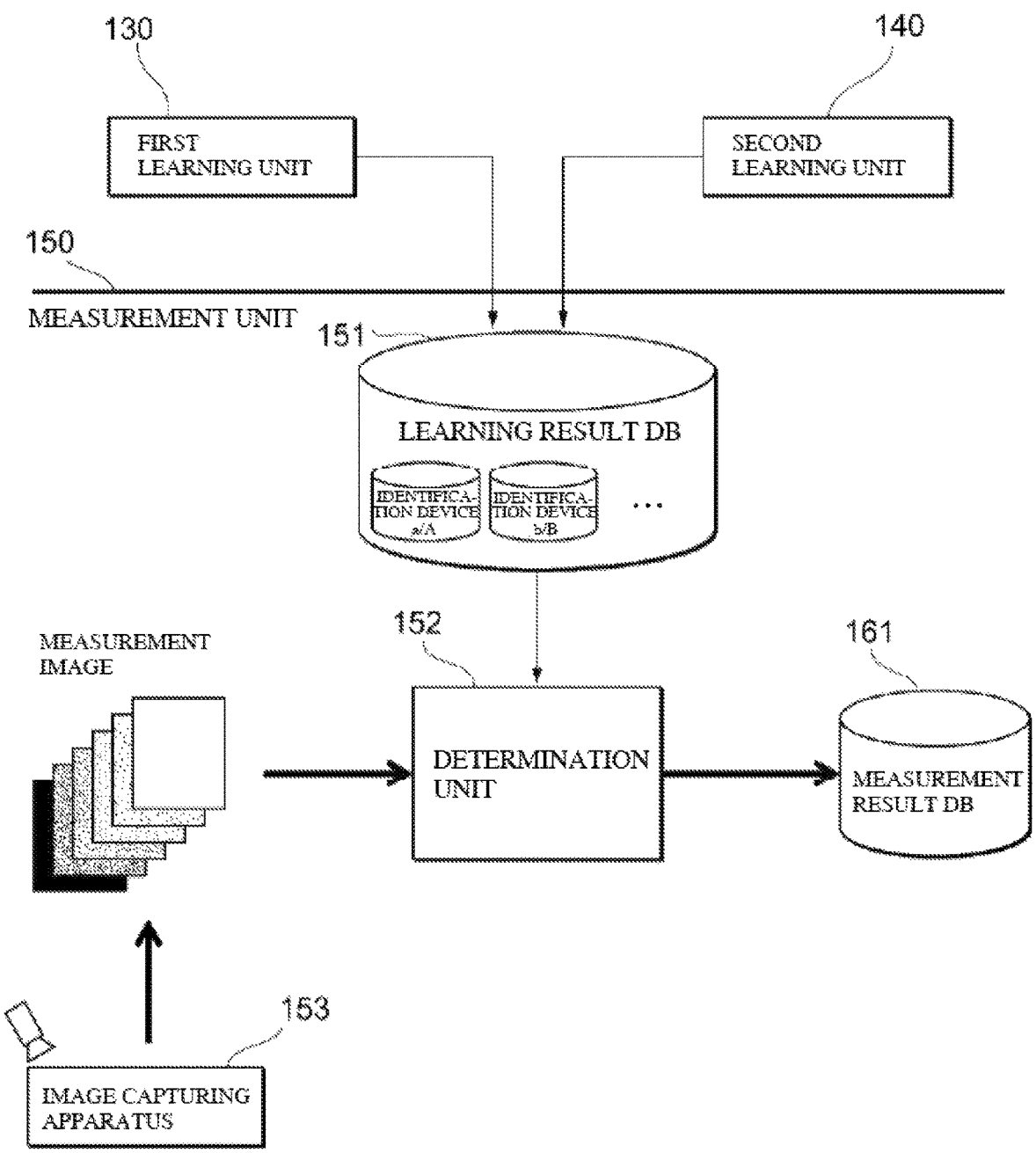
FIG. 3 is a conceptual diagram illustrating processing in a measurement unit of a data generation apparatus according to an embodiment.

FIG. 3 is a conceptual diagram illustrating the processing to be performed in the measurement unit 150 of the data generation apparatus 100 according to an embodiment. The measurement unit 150 causes the identification devices that have been generated by the learning processing and the evaluation processing using learning data to output attribute information of a measurement image of the object to be inspected captured by the image capturing apparatus 153, and outputs a measurement result including the measurement image and the attribute information. The attribute information includes information indicating whether or not a defect is included, and if one or more defects are included, the position and the type of each defect.

The measurement unit 150 acquires, from the first learning unit 130 and the second learning unit 140, information including the model structures and the processing parameters of the identification devices, as the learning result data. The measurement unit 150 includes a learning result DB 151 that stores acquired learning result data. Also, the measurement unit 150 includes the image capturing apparatus 153 that captures the object to be inspected. The image capturing apparatus 153 may be installed so as to capture a production line of a factory, and may constitute a portion of the production line, for example. The image capturing apparatus 153 may capture images, as measurement images, of components and products (hereinafter, components and products may be collectively referred to as "works") serving as objects to be inspected that flow (are transported) in the production line.

The measurement unit 150 includes the determination unit 152 that outputs attribute information of the measurement image using an identification device that is configured based on the learning result data stored in the learning result DB 151. The determination unit 152 determines whether or not the object to be inspected includes one or more defects based on the measurement image, and if a defect is included, may output attribute information including information indicating the position of the defect on the measurement image. Here, the information indicating the position of the defect on the measurement image may be a frame indicating a region corresponding to the defect on the measurement image.

The measurement unit 150 outputs, to the measurement result management unit 160, results of measurement on an object to be inspected that include the measurement image, and the attribute information of the measurement image output from the identification device. Note that the measurement unit 150 may also output identification information for identifying individual objects to be inspected to the measurement result management unit 160 along with the measurement results. Here, the identification information of the object to be inspected may also be acquired from the measurement image, or may be acquired from the outside via a predetermined interface. A production number or a figure obtained by coding the production number may also be used as the identification information, for example. Therefore, the identification information is preferably information with which objects to be inspected can be individually identified. Note that the measurement unit 150 may also output the result of measurement on an object to be inspected to a unit other than the measurement result management unit 160. For example, the measurement unit 150 may also output the measurement results and the identification information to the later-described user interface 170. Alternatively, the measurement unit 150 may also directly or indirectly output the measurement results to a sorting apparatus (not shown), for example. The sorting apparatus sorts the object to be inspected based on the acquired measurement result.

Configuration of Measurement Result Management Unit

The measurement result management unit 160 includes a measurement result DB 161 that stores the measurement images included in a measurement results, and the attribute information of the measurement images output from the identification device, in association with each other. Note that the measurement result management unit 160 may also acquire identification information for identifying the object to be inspected along with the measurement result. Here, the identification information of the object to be inspected may be acquired from the measurement unit 150, or may be acquired from the outside via a predetermined interface. Alternatively, the measurement result DB 161 classifies and stores the measurement images according to the type of attribute included in the attribute information, for example, in association with the attribute of the type of defect.

The measurement result management unit 160 outputs the measurement results to the user interface 170. Here, the measurement result management unit 160 may also output the identification information of the object to be inspected to the user interface 170. The measurement result management unit 160 outputs the measurement results also to the later-described image correction unit 120. Here, the measurement result management unit 160 may also output the identification information of the object to be inspected to the image correction unit 120.

User Interface

In an embodiment, the user interface 170 is used by the second operator to confirm the measurement result of the measurement unit 150, and to execute an operation (region designation) to designate (indicate) a region including the defect included in the measurement image. The user interface 170 at least includes a display unit (such as a liquid crystal display apparatus) for displaying a measurement result of the measurement unit 150, and an input unit (such as a touch panel, a keyboard, or a mouse) for allowing the second operator to perform region designation. The second operator determines, based on the measurement result displayed in the display unit, whether or not the attribute information of the object to be inspected that has been output by an identification device is correct, and may input a region surrounding the defect using the input unit. Here, the input unit may accept an input of one or more points of the image that designate a point or points inside the region that includes a defect, or may accept an input of one or more points of the image that designate the outer shape of the region. The results of region designation performed by the second operator are output to the image correction unit 120. Note that the person who can perform the input to designate the region may be restricted by the later-described image correction unit 120 to a person who is qualified to have predetermined execution authority. With this, along with the reliability of input operation being improved, the quality of new learning data to be generated and the identification accuracy of an identification device to be generated using the new learning data can be improved. Also, the first operator and the second operator may be the same.

Configuration of Image Correction Unit

The image correction unit 120 corrects the acquired region and generates learning data. The image correction unit 120 includes the generation unit 121, the corrected image database (hereinafter referred to as a "corrected image DB") 122, the correction unit 123, and a selection unit 124, and generates learning data by correcting the region accepted by the user interface 170. Note that, in the following, an example will be described in which the image correction unit 120 generates new learning data by correcting the region accepted by the user interface 170, and associating the corrected region with the measurement image, but new learning data may also be generated by correcting the region accepted by the user interface 180, and associating the corrected region with a sample image.

The correction unit 123 corrects the region acquired by the user interface 170 (acquisition unit) by expanding the outer edge of the region such that the number of pixels included inside the region increases by a predetermined amount. The correction unit 123 makes a correction by which, by expanding the outer edge of the region, the number of pixels indicating a normal part inside the region increases. The correction unit 123 may also acquire a plurality of regions of the measurement image from the user interface 170, and make a correction, with respect to each region, expanding the outer edge of those regions. The regions may be corrected such that a region that has been designated as surrounding a defect is enlarged in every direction by one or a predetermined number of pixels.

The correction unit 123 may also make a plurality of different corrections to the region acquired by the user interface 170. For example, the correction unit 123 may also make a first correction by which the region that has been designated as including a defect is slightly enlarged so as to surround that region, and make a second correction by which the region obtained by the first correction is further enlarged so as to surround that region. In this way, the correction unit 123 may perform a plurality of different corrections whereby the region is enlarged stepwise. The correction unit 123 may also make a third correction to the region designated as including a defect such that one or more of its outer edges are expanded, and make a fourth correction by which one or more of its outer edges that are different from that in the third correction are expanded. In this way, the correction unit 123 may make a plurality of corrections having different directivities.

Also, the correction unit 123 may correct the region such that the outer edge of the region is shrunk, if a predetermined condition is satisfied. Here, if the predetermined condition is satisfied, instead of making a correction by which the outer edge of the region acquired by the user interface 170 is expanded, the correction unit 123 may also correct the region such that the outer edge of the region is shrunk, or correct the region such that one or more of the outer edges of the acquired region are shrunk. For example, if the region including a defect that has been designated by the second operator includes, in a first portion, a pattern that is not a defect, then the region may be corrected such that the outer edge of the acquired region is shrunk in the first portion. Here, the region may also be corrected such that one or more of the outer edges of the acquired region are expanded in a portion other than the first portion. Also, for example, if the second operator designates the region including a defect such that the area of a portion other than the defect is larger than that of the defect, the correction unit 123 may correct the region such that the outer edge of the designated region is shrunk. In this case, the predetermined condition may also be a condition relating to the percentage of a portion other than the defect in the region. The predetermined condition may be a condition that the percentage of a portion other than the defect in the region is at least a threshold value, for example. Accordingly, even if the region including a defect has been designated such that the area of a portion other than the defect is larger than that of the defect, learning data can be generated with which an identification device can appropriately compare the defect included in the image and the other portion. Therefore, when learning processing is performed with an identification device, an identification device having high determination accuracy can be generated with a relatively small computation amount. Note that the predetermined condition may also be a condition relating to the number of pixels of the region acquired by the user interface 170, or may be a condition relating to a ratio between the number of pixels in the region acquired by the user interface 170 and the number of pixels of the entire measurement image.

The correction unit 123 may also determine the expansion/shrinkage rate of the outer edge of the region based on the area ratio between the defect and the other (remaining) portion, in the region acquired by the user interface 170. Here, the ratio between the defect and the other portion may be obtained by the ratio between the number of pixels corresponding to the defect and the number of pixels corresponding to the portion other than the defect, in the designated region, but may also be obtained using other methods. Accordingly, if the region including a defect is designated as including almost only the defect, a correction can be made to expand the outer edge of the region by a relatively large amount, and if the region is designated so as to include sufficient other portions than the defect, a correction can be made to expand the outer edge of the region by a relatively small amount.

Also, the correction unit 123 may also determine the method of correction to be made to the region based on a background pattern other than the defect included in the region acquired by the user interface 170. Here, the "background pattern" may be a pattern of the surface of the object to be inspected, a logo and text added to the object to be inspected, or an edge or the like of the object to be inspected. For example, when a certain uniform texture pattern appears as a result of hairline processing or the like being performed on the object to be inspected, the method of correction may be determined such that the region is expanded in a direction along the texture pattern. Also, if a logo is added to the object to be inspected, or the object to be inspected includes an edge, the direction in which the region is expanded and the rate at which the region is expanded may be determined such that the logo and the edge are not included in the region. Accordingly, the correction method can be determined such that the background pattern other than the defect included in the region does not change significantly before and after the correction, and learning data can be generated with which an identification device can appropriately compare the defect included in the image and the other portion.

The generation unit 121 generates learning data by associating the region corrected by the correction unit 123 with the image. The generation unit 121 may, if the correction unit 123 has made a correction to a plurality of regions, generate a plurality of pieces of learning data by associating the plurality of corrected regions with the image. Accordingly, even if the image includes a plurality of defects, and a plurality of regions have been designated as including almost only the respective defects, learning data can be generated with which an identification device can appropriately compare the defect included in the image and the other portion.

The generation unit 121 may also generate a plurality of candidates of learning data corresponding to a plurality of different corrections made by the correction unit 123 by associating a plurality of corrected regions, which are obtained by the correction unit 123 having made the plurality of different corrections, with the image. Here, not all of the plurality of generated candidates of learning data may be actually used as the learning data. That is, only some of or all of the plurality of generated candidates of learning data may be selected as the learning data.

The corrected image DB 122 stores new learning data generated by the generation unit 121. The corrected image DB 122 may temporarily store the measurement images and the region accepted from the user interface 170, or may temporarily store the sample images and the regions accepted from the user interface 170.

The image correction unit 120 may cause the first learning unit 130 or the second learning unit 140 to train a plurality of identification devices (a, b, c, A, B . . . ) that identify whether or not the object to be inspected includes a defect based on an input image, by applying a plurality of pieces of learning data generated by the generation unit 121 to the training of the different identification devices (a, b, c, A, B . . . ). When the correction unit 123 has made a correction while changing the expanding rate of the region in three stages, for example, the image correction unit 120 may cause the first learning unit 130 or the second learning unit 140 to train the identification devices (a, b, c, A, B . . . ) using a plurality of candidates of first learning data including a plurality of regions that have been corrected with the expanding rate in the first stage, cause the first learning unit 130 or the second learning unit 140 to train the identification devices (a, b, c, A, B . . . ) using a plurality of candidates of second learning data including a plurality of regions that have been corrected with the expanding rate in the second stage, and cause the first learning unit 130 or the second learning unit 140 to train the identification devices (a, b, c, A, B . . . ) using a plurality of candidates of third learning data including a plurality of regions that have been corrected with the expanding rate in the third stage. With this, it can be tried which correction method is optimum for improving the identification performance of the identification devices (a, b, c, A, B . . . ).

The selection unit 124 selects one or more pieces of learning data from the plurality of candidates of learning data based on the identification performance of the plurality of trained identification devices trained by the first learning unit 130 or the second learning unit 140. The identification devices are trained using the plurality of pieces of generated learning data independently, and one or more pieces of learning data are selected based on the identification performance, and as a result, learning data can be selected with which an identification device can appropriately compare a defect and the other portions included in an image. Specifically, in a situation in which new learning data is generated, there are cases where an operator having a little knowledge about machine learning performs operations to generate learning data. Even in these cases, according to an embodiment, new learning data that corresponds to a defect of the object to be inspected that is generated in each processing step can be easily generated. As a result of generating an identification device that has been trained using the new learning data, an identification device appropriate for each processing step can be generated, and therefore the identification accuracy can be improved.

The selection unit 124 may also select one or more pieces of learning data from a plurality of candidates of learning data based on the degree of similarity between the region before correction made by the correction unit 123 and the region after correction made by the correction unit 123. Note that the degree of similarity of the region before and after correction may be calculated using a grayscale level ranging between black and white, or the number and strength of edges, for example. For example, the grayscale level can be expressed by brightness of pixels included in the region. Therefore, when the grayscale level is used, the average value of grayscale levels of pixels inside the region is calculated, the average value N1 of the region before correction is compared with the average value N2 of the corrected region, and if the difference therebetween is less than a pre-determined threshold value M, the region before and after correction may be determined to be similar, and the candidate may be adopted as the learning data. Also, when the number of edges is used, for example, the number of edges included in the region is calculated before and after correction, the number of edges E1 before correction is compared with the number of edges E2 after correction, and if the difference therebetween is less than a pre-determined difference D in the number of edges, the region before and after correction may be determined to be similar, and the candidate may be adopted as the learning data. Here, the number of edges in the region can be calculated using a known method such as a Sobel filter or a Laplacian filter. Note that the degree of similarity of the region before and after correction may also be calculated by combining a plurality of indicators such as the grayscale level, the number of edges, and other indicators.

If the degree of similarity is greater than the predetermined value, an image with which the corrected region is associated may be adopted as the learning data, and if the degree of similarity is less than the predetermined value, an image with which the corrected region is associated may not be adopted as the learning data. As a result of calculating the degree of similarity with respect to the region before and after correction, when a certain uniform texture pattern appears as a result of performing hairline processing or the like on the object to be inspected, it can be determined whether or not the region has been corrected such that the form of the texture pattern is similar, for example. Also, when a logo is added to the object to be inspected, or the object to be inspected includes an edge, as a result of calculating the degree of similarity, it can be determined whether or not the region has been corrected such that the logo and the edge are not included in the region. Accordingly, the learning data can be adopted such that an image part that is included in the corrected region is not a cause of an erroneous determination that the image includes a defect, and learning data with which an identification device can appropriately compare a defect and the other portion included in the image can be selected.

The selection unit 124 may also calculate the degree of similarity based on the correlation between the pixel values of pixels at the outer edge of the region before correction is made by the correction unit 123 and the pixel values of pixels at the outer edge of the corrected region is made by the correction unit 123. As a result of expanding the outer edge of the region, the outer edge of the corrected region includes an image part that was not included in the region before correction. For example, if this image part includes a feature pattern such as a logo, the image part may be a cause of erroneous determination that the image part is a defect. However, as a result of calculating the degree of similarity based on the correlation in the pixel value of pixels at the outer edge before and after correction, the corrected region that may be a cause of erroneous determination can be excluded from the learning data.

Note that, when the region is corrected by the correction unit 123 such that the outer edge of the designated region is shrunk, the selection unit 124 may also calculate the degree of similarity based on the correlation between the pixel values of pixels at the outer edge of the region before correction and the pixel values of pixels at the outer edge of the corrected region. For example, if, as a result of shrinking the outer edge of the region, a portion of a defect protrudes from the corrected region, and the defect crosses the outer edge of the corrected region, such a corrected region can be excluded from the learning data.

Hardware Configuration

Figure 4:
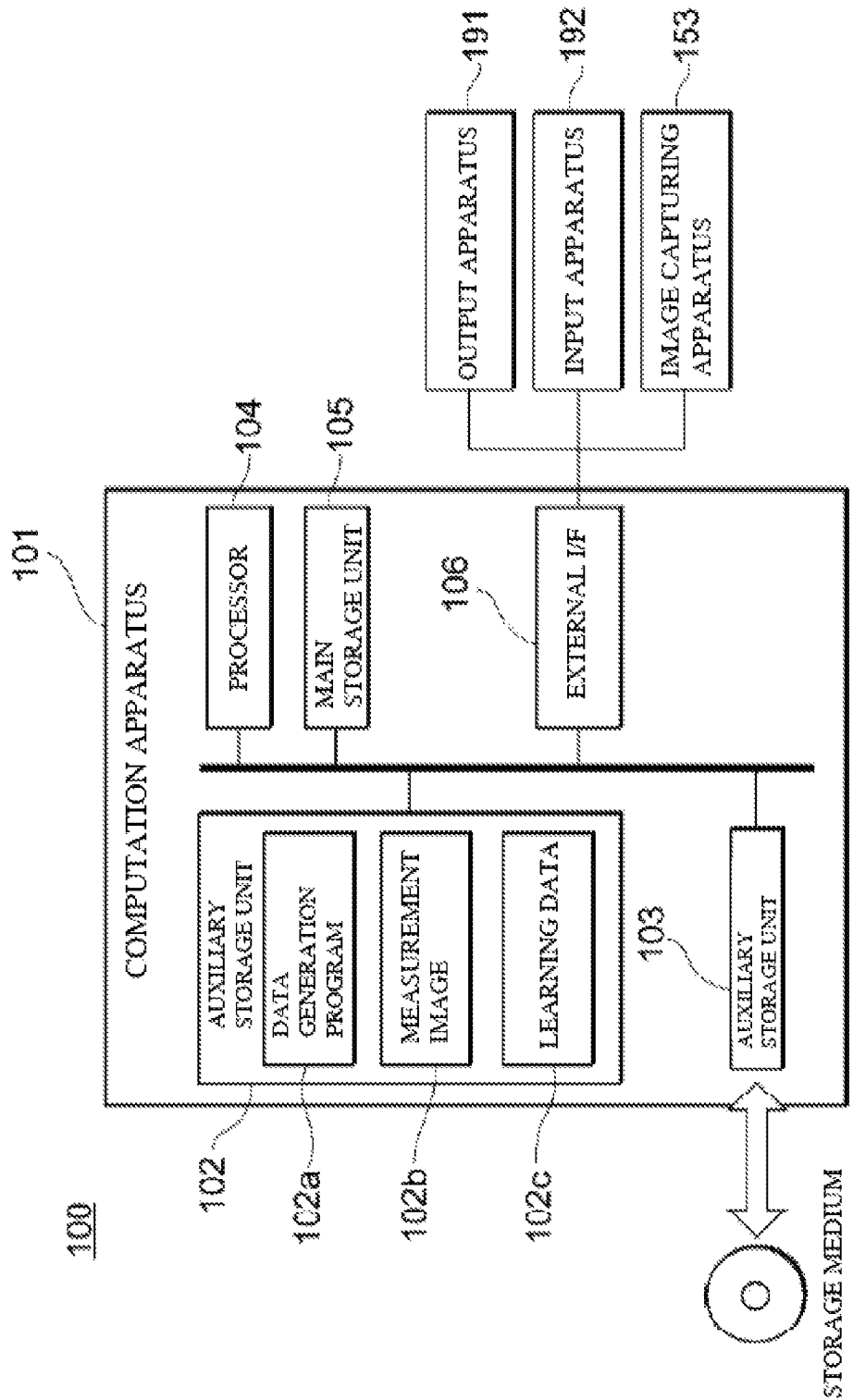
FIG. 4 is a block diagram illustrating a hardware configuration of a data generation apparatus according to an embodiment.

Next, an example of the hardware configuration of the data generation apparatus 100 according to an embodiment will be described using FIG. 4. The data generation apparatus 100 according to an embodiment may be an information processing apparatus that includes a computation apparatus 101, an output apparatus 191, an input apparatus 192, and the image capturing apparatus 153. Here, the output apparatus 191 and the input apparatus 192 constitute the user interface 170 and the user interface 180.

The computation apparatus 101 may also include the auxiliary storage units 102 and 103, the processor 104, a main storage unit 105, and an external interface (hereinafter, referred to as an "external I/F").

The computation apparatus 101 includes a CPU (Central Processing Unit), a RAM (Random Access Memory), a ROM (Read Only Memory), and the like, and controls the constituent elements according to information processing. The processor 104 may include a CPU, and the auxiliary storage units 102 and 103 and the main storage unit 105 may each include a RAM and a ROM. The auxiliary storage unit 102 may be a hard disk drive, a solid-state drive, or the like, and may store a data generation program 102a to be executed by the processor 104, a measurement image 102b captured by the image capturing apparatus 153, learning data 102c, and the like. Also, the auxiliary storage units 102 and 103 may store an appropriate ratio between the number of pixels indicating a defect and the number of pixels indicating a normal part in the region, the appropriate ratio being a target value when the region including the defect in the image is enlarged or shrunk. For example, when the ratio between the number of pixels indicating a defect and the number of pixels indicating a normal part in the region is larger than 1.0, that is, the number of pixels indicating a defect is relatively large, the outer edge of the region is enlarged or shrunk such that the number of pixels indicating a normal part increases. Here, the appropriate ratio may be less than 1.0, or preferably less than 0.5 at which the number of pixels indicating a normal part is relatively large. The auxiliary storage unit 103 and the main storage unit 105 may be a hard disk drive, or a solid-state drive, for example, similarly to the auxiliary storage unit 102. The data generation program 102a is a program for performing processing to realize the functions of the image collection unit 110, the image correction unit 120, the first learning unit 130, the second learning unit 140, the measurement unit 150, and the measurement result management unit 160, described above, and as a result of the program being executed by the processor 104, the functions are realized. Note that the data generation program 102a may also be a program for performing processing to realize some functions of the image collection unit 110, the image correction unit 120, the first learning unit 130, the second learning unit 140, the measurement unit 150, and the measurement result management unit 160, or may also include a program for performing processing for realizing other functions.

The external I/F 106 is a USB (Universal Serial Bus) port or the like, and is an interface for connecting to external apparatuses such as the output apparatus 191, the input apparatus 192, and the image capturing apparatus 153. Note that the data generation apparatus may also include an interface for performing wired or wireless communication via a network, such as a wired LAN (Local Area Network) module or a wireless LAN module.

A storage medium is a medium that stores information such as programs and the like via an electrical, magnetic, optical, mechanical or chemical effect such that the stored information such as programs can be read by an apparatus such as a computer. The storage medium may be a CD (Compact Disk) or a DVD (Digital Versatile Disk), for example, and may store the data generation program 102a. The data generation program 102a stored in the storage medium is copied to the auxiliary storage unit 103, and may also be copied to the auxiliary storage unit 102 and the main storage unit 105. In FIG. 4, a disk-type storage medium such as a CD or a DVD is illustrated as an example of the storage medium. However, the type of the storage medium is not limited to the disk type, and may be a type other than the disk type. A semiconductor memory such as a flash memory can be given as an example of a storage medium other than a disk-type storage medium. Also, the data generation apparatus 100 may acquire data such as the data generation program 102a using wired or wireless communication via a network.

Note that, in relation to the specific hardware configuration of the data generation apparatus 100, constituent elements can be omitted, substituted and added as appropriate depending on an embodiment. For example, the computation apparatus 101 may include a plurality of processors, or may include a GPU (Graphical Processing Unit) or an FPGA (Field Programmable Gate Array). Also, the data generation apparatus 100 may also be constituted by a plurality of information processing apparatuses. The data generation apparatus 100 may be constituted also by, other than an information processing apparatus designed only for the service that is provided, a general-purpose desk top PC (Personal Computer), a tablet PC, or the like.

3. Exemplary Operation

Figure 5:
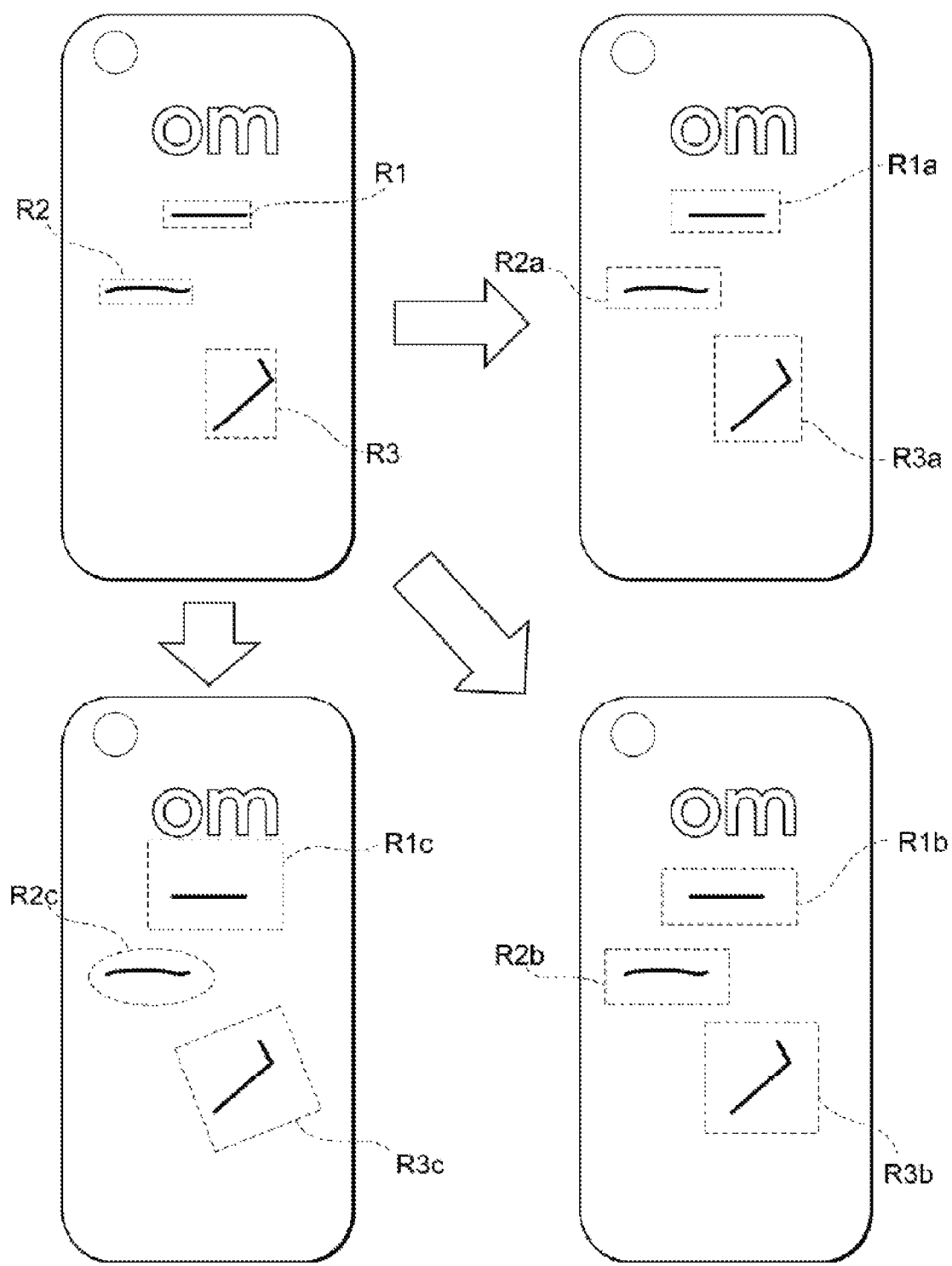
FIG. 5 is a diagram illustrating an example of correction of regions in an image performed by a data generation apparatus according to an embodiment.

FIG. 5 is a diagram illustrating examples of correction of regions in an image performed by the data generation apparatus 100 according to an embodiment. An example of a measurement image obtained by capturing a back face of a smartphone, and regions R1, R2, and R3 that respectively surround three defects included in the measurement image, which are indicated by broken lines is shown in an upper left portion in FIG. 5. Here, the regions R1, R2, and R3 are assumed to be designated by the second operator. The region R1 and the region R2 are each designated by a rectangle in which the difference in length between the long sides and the short sides is relatively large so as to surround a horizontally elongated defect. Also, the region R3 is designated by a rectangle in which the difference in length between the long sides and the short sides is relatively small so as to surround a defect having a polygonal line shape. Here, the broken lines that designate the regions R1, R2, and R3 are outer edges of the regions R1, R2, and R3. That is, the outer edge of a region is an outer peripheral portion of the region, and has substantially the same meaning as the boundary of a region. Text characters (logo) "om" are added on the back face of the smartphone of this example, and an opening for a camera is provided in an upper left portion.

A first example of the correction of regions is shown in an upper right portion in FIG. 5, a second example of the correction of regions is shown in a lower right portion thereof, and a third example of the correction of regions is shown in lower left portion thereof. In the first example of the correction of regions, the regions R1, R2, and R3 designated by the second operator are corrected such that the outer edge of the region is expanded with a first expanding rate, and thus regions R1a, R2a, and R3a are obtained. Also, in the second example of the correction of regions, the regions R1, R2, and R3 designated by the second operator are corrected such that the outer edge of the region is expanded with a second expanding rate, and thus regions R1b, R2b, and R3b are obtained. Here, the second expanding rate is larger than the first expanding rate. In this way, the correction unit 123 may perform a plurality of different corrections on regions. As a result of generating a plurality of pieces of learning data in which regions on which a plurality of different corrections have been made are respectively associated with the image, the plurality of pieces of learning data in which the easiness of comparison between a defect and the other portion is different can be generated.

In the third example of the correction of regions, the regions R1, R2, and R3 designated by the second operator are corrected such that the regions are enlarged and changed in shape, and thus regions R1c, R2c, and R3c are obtained. The region R1c, of these regions, is obtained by correcting the region R1 before correction by which the expanding rate of the short sides is larger than that of the long sides. Also, the extension of the short sides is performed in a range so that it does not overlap the text characters "om". In this way, the correction unit 123 may determine the method of correcting a region based on the background pattern other than the defect in the region. That is, when the region before correction does not include text and an edge of a component, the method of correction may be determined such that the corrected region will not include any text or an edge of a component.

Also, the region R2c is corrected to have an elliptical shape, although the region R2 before correction is rectangular. In this way, the correction unit 123 may change the outer shape of a region. Furthermore, although being a rectangle similar to the region R3 before correction, the region R3c is a rectangle that is rotated relative to the region R3 before correction, and is corrected so as to increase the size relative to the region R3 before correction. In this way, the correction unit 123 may rotate the region.

Figure 6:
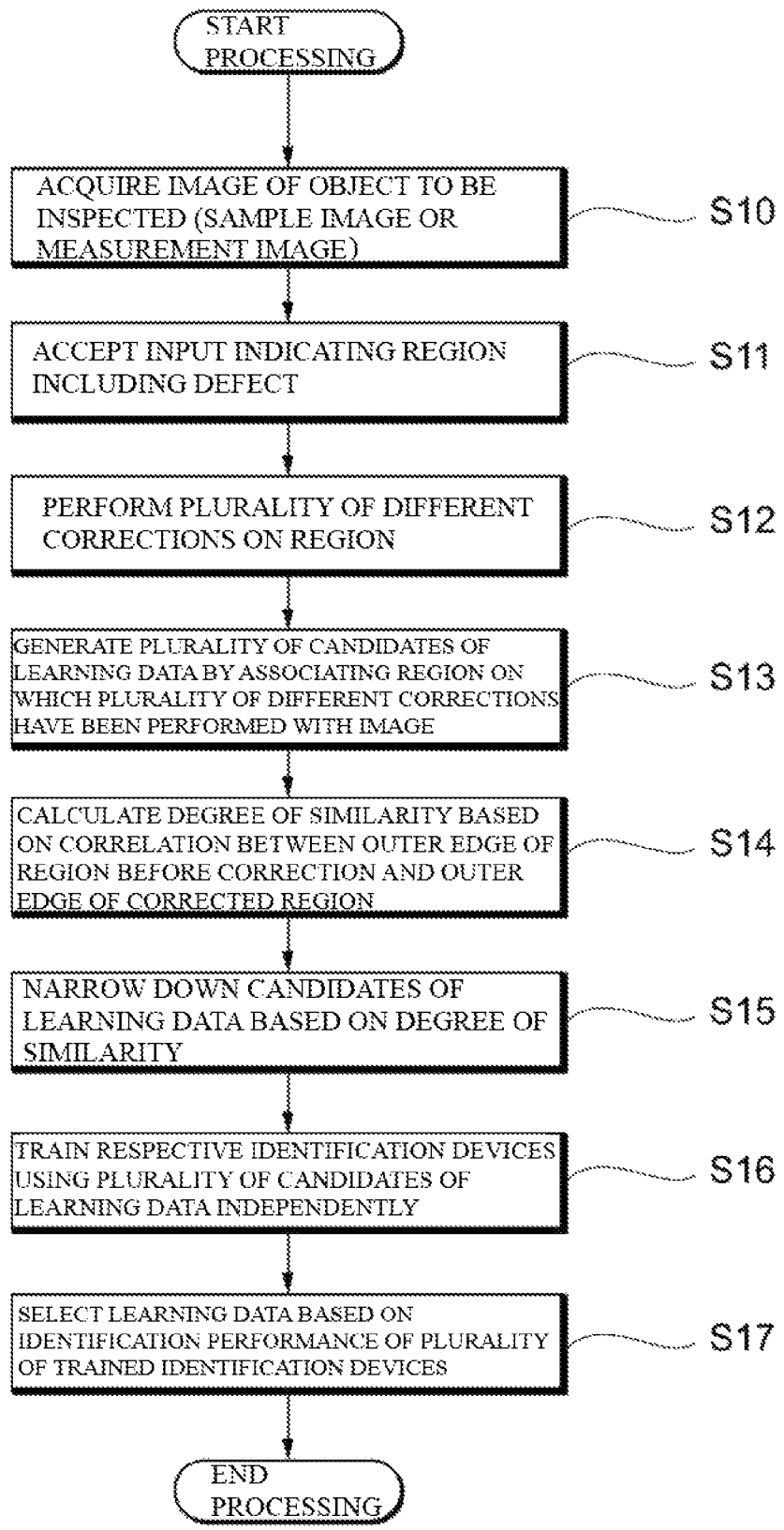
FIG. 6 is a flowchart illustrating first processing to be executed by a data generation apparatus according to an embodiment.

FIG. 6 is a flowchart illustrating first processing to be executed by the data generation apparatus 100 according to an embodiment. The first processing is processing in which an input indicating a region including a defect of an image is accepted, the region is corrected, the corrected region is associated with the image, and new learning data is generated. The data generation apparatus 100, first, acquires an image of the object to be inspected (S10). Here, the image may be a sample image that is pre-stored in the image DB 112, or may be a measurement image newly captured by the image capturing apparatus 153.

The data generation apparatus 100 accepts an input indicating a region including a defect of the image with the user interfaces 170 and 180 (S11). Note that the method of accepting an input indicating a region will be described in detail using the following diagram.

The correction unit 123 of the data generation apparatus 100 performs a plurality of different corrections on the input region (S12). The correction unit 123 may enlarge the input region with a plurality of different expanding rates, rotate the region by a plurality of different angles, or change the shape of the region to a plurality of different shapes, for example.

The generation unit 121 of the data generation apparatus 100 generates a plurality of candidates of learning data by associating the region on which a plurality of different corrections have been made with the image (S13). The selection unit 124 calculates the degree of similarity based on the correlation between the outer edge of the region before correction and the outer edge of the corrected region (S14), and narrows down the candidates of the learning data based on the degree of similarity (S15). The selection unit 124 may not adopt an image with which the corrected region whose degree of similarity with the region before correction is smaller than a predetermined value is associated as the learning data, and may adopt an image with which the corrected region whose degree of similarity with the region before correction is at least the predetermined value is associated as the learning data.

The first learning unit 130 or the second learning unit 140 trains the respective identification devices (a, b, c, A, B . . . ) using the narrowed down plurality of candidates of learning data, independently (S16). Also, the selection unit 124 selects one or more pieces of learning data from the plurality of candidates of learning data based on the identification performance of the plurality of trained identification devices (a, b, c, A, B . . . ) (S17). The selection unit 124 may select candidates of learning data, of the plurality of candidates of learning data used to train the identification devices (a, b, c, A, B . . . ) independently, with which the identification performance is at least the predetermined value as the one or more pieces of learning data, and may not select candidates of learning data with which the identification performance is less than the predetermined value as the learning data. Then, the first processing is ended.

With the data generation apparatus 100 according to an embodiment, even if the region including a defect is designated as including almost only the defect, the region is corrected so as to appropriately include the defect and the other (remaining) portion, and as a result, learning data with which an identification device can appropriately compare between the defect and the other portion included in the image can be generated. Accordingly, when learning processing is performed with an identification device, an identification device having high determination accuracy can be generated with a relatively small computation amount.

Figure 7:
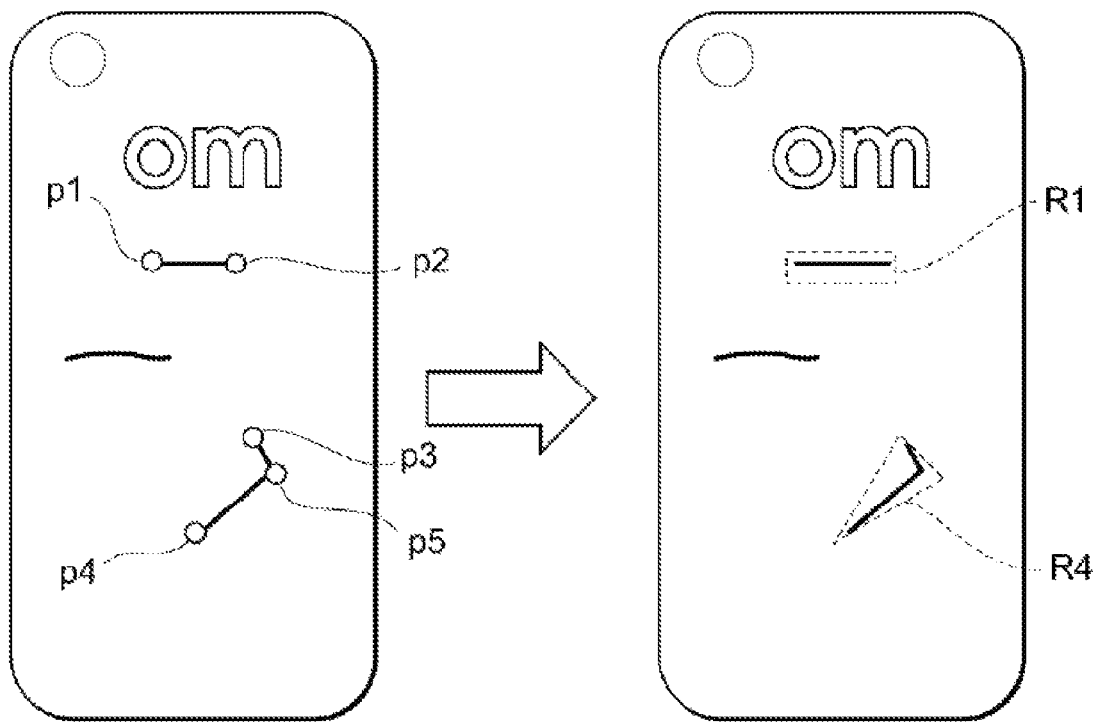
FIG. 7 is a diagram illustrating an example of designating regions of an image by a data generation apparatus according to an embodiment.

FIG. 7 is a diagram illustrating an example of designating regions of an image by the data generation apparatus 100 according to an embodiment. The data generation apparatus 100 accepts input of information designating a region that includes a defect in an image with the user interface 170 or 180 (input unit), and acquires the region that includes the defect in the image based on the information that has been input using the input unit. Here, the information designating a region may be one or plurality of points, a line, or an area designating the region. The input unit may be a touch panel, or a pointing device such as a mouse, for example, and may accept input of points in an image, input of a line, input of a polygon such as a rectangle, or input of an ellipse. As a result of including such an input unit, designation of a region that includes a defect can be accepted from an operator that has confirmed an image of the object to be inspected.

In this example, the input unit accepts input of a plurality of points p1 and p2 of the image to designate points inside a region R1 that includes a defect of the image. The points p1 and p2 are input so as to be positioned at both ends of the defect, and the data generation apparatus 100 generates the region R1 with a rectangular region including the points p1 and p2, based on the input points p1 and p2. As a result of letting an operator, who has confirmed the image of the object to be inspected, designate points inside the region to be set, in this way, regardless of the shape of the defect, the operator can designate the region including a defect with a simple operation.

Also, in this example, the input unit accepts input of a plurality of points p3, p4, and p5 in the image to designate the outer shape of a region RA that includes a defect of the image. The points p3, p4, and p5 are input so as to be positioned at end points and an inflection point, and the data generation apparatus 100 generates the region RA with a triangular region so as to envelop the points p3, p4, and p5, based on the input points p3, p4, and p5. As a result of letting an operator, who has confirmed the image of the object to be inspected, designate the outer shape of the region, in this way, regardless of the shape of the defect, the operator can designate the region including a defect with a simple operation.

Figure 8:
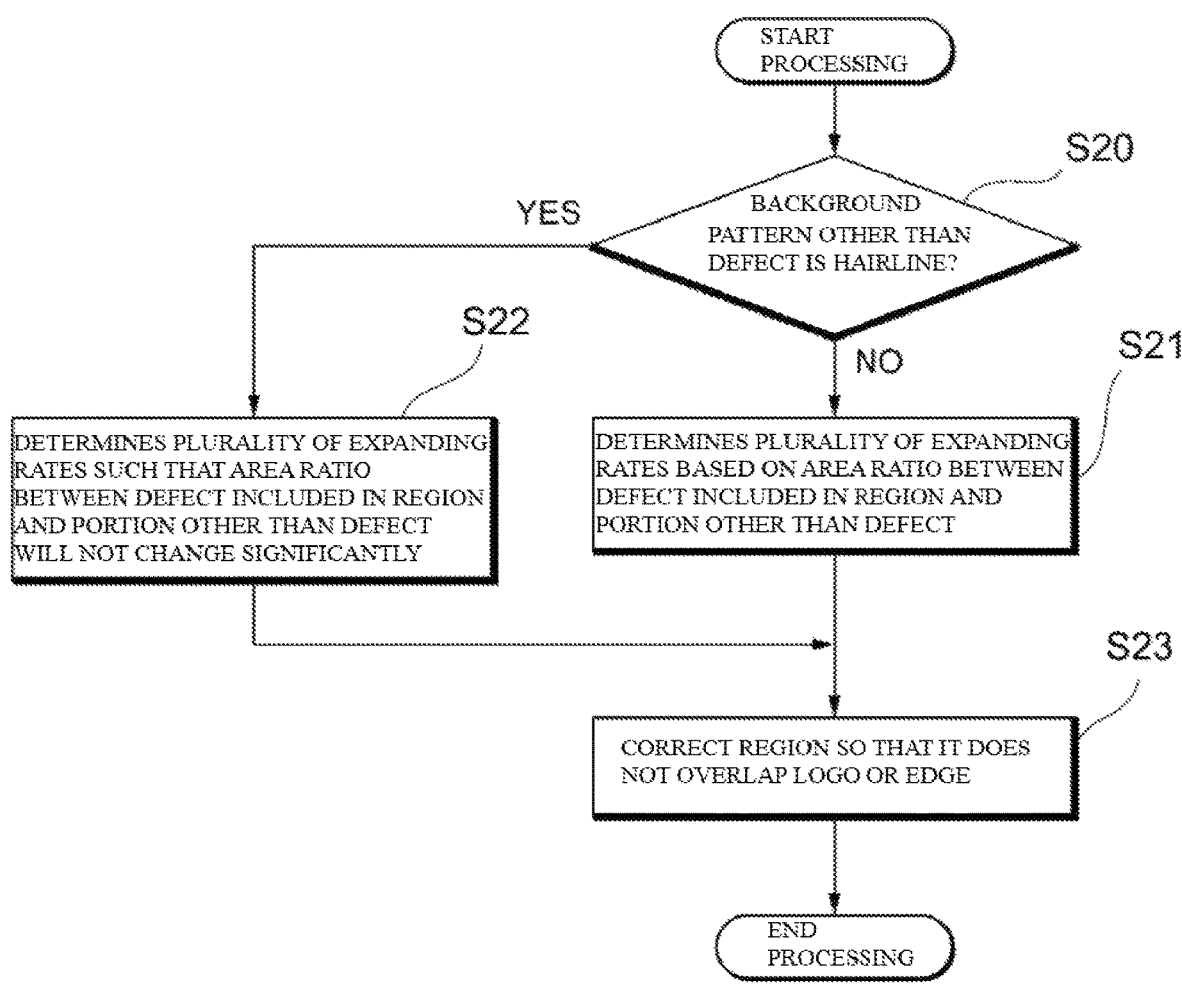
FIG. 8 is a flowchart illustrating second processing to be executed by a data generation apparatus according to an embodiment.

FIG. 8 is a flowchart illustrating second processing to be executed by the data generation apparatus 100 according to an embodiment. The second processing is processing that is executed after a region including a defect in an image has been input, and is processing for correcting the region. Note that the second processing is processing that is executed after the region including a defect in an image has been input, and may be executed separately from the first processing. Also, the second processing may be executed as processing that is executed between steps S11 and S12 of the first processing in order to determine the method of correction to be executed in step S12.

The data generation apparatus 100 determines whether or not the background pattern of the region input to the acquired image other than the defect is a hairline pattern (S20). If the background pattern of the region other than the defect is not a hairline pattern (S20: NO), the correction unit 123 determines a plurality of expanding rates based on the area ratio between the defect included in the region and the portion other than the defect (S21). The correction unit 123 may determine the expanding rate such that the expanding rate increases as the ratio occupied by the defect in the entire region increases.

On the other hand, if the background pattern of the region other than the defect is a hairline pattern (S20: YES), the correction unit 123 determines a plurality of expanding rates such that the area ratio between the defect included in the region and the portion other than the defect will not change significantly (S22). When hairline processing has been performed on the object to be inspected, if the designated region is changed significantly, various hairline patterns are included in the region, and therefore, these patterns may be erroneously recognized as a defect. Accordingly, when the region is corrected such that the designated region is not changed significantly, learning data with which the identification performance of an identification device increases can be generated. Note that, in FIG. 8, the correction method is changed depending on whether or not the background pattern of a portion other than the defect is a hairline pattern, but the method for changing the correction method is not limited to this example. For example, the correction method may also be changed depending on whether or not the background pattern of an acquired image other than the defect is uniform. Also, in FIG. 8, a method in which a plurality of expanding rates are set is adopted as a method for changing the correction method, but the method for changing the correction method is not limited to this example. For example, the direction to which the outer edge is expanded by correction may be changed.

The correction unit 123 corrects the region so that it does not overlap a logo or an edge on the premise of observing the determined expanding rate (S23). That is, if a logo or an edge will be included in the corrected region when the designated region is expanded with the determined expanding rate, the region will be corrected such that the region is at least not expanded in a direction approaching the logo or the edge so as to not include the logo or the edge. Accordingly, a loge or an edge are prevented from being erroneously recognized as a defect, and learning data in which a cause of erroneous recognition has been excluded can be generated. Then, the second processing ends. As a result of changing the correction method in accordance with the type of the background pattern, that is, depending on whether or not the background pattern of an acquired image other than the defect includes a predetermined pattern or the like, the possibility that the image part included in the corrected region other than the defect will be erroneously recognized as a defect can be reduced.

The embodiments described above is for the purpose of facilitating understanding of the present invention, and is not to be interpreted as limiting the present invention. Constituent elements of embodiments and arrangement, materials, conditions, shapes and sizes thereof are not limited to those exemplified, and can be changed as appropriate. In addition, configurations described in different embodiments can be partially substituted or combined.

Note 1

A data generation apparatus (100) including:

an acquisition unit (153, 170, 180) configured to acquire an image of an object to be inspected including a defect, and a region of the image that includes the defect;

a correction unit (123) configured to correct the region acquired by the acquisition unit (153, 170, 180) such that an outer edge of the region is expanded so as to increase the number of pixels included in the region by a predetermined amount; and a generation unit (121) configured to generate learning data by associating the region corrected by the correction unit with the image.

Note 2

The data generation apparatus according to Note 1, wherein the correction unit (123) is configured to perform a plurality of different corrections on a region acquired by the acquisition unit (153, 170, 180), and the generation unit (121) is configured to associate the region on which a plurality of different corrections have been performed by the correction unit (123) with the image, and generate a plurality of candidates of learning data corresponding to the plurality of different corrections performed by the correction unit (123).

Note 3

The data generation apparatus according to Note 1 or 2, the correction unit (123) is configured to determine the method for correcting the region based on a background pattern of a region acquired by the acquisition unit (153, 170, 180) other than the defect.

Note 4

The data generation apparatus according to Note 2, further including:

a learning unit (130, 140) configured to train a plurality of identification devices that identify whether or not the object to be inspected includes a defect based on an input image, by respectively applying the plurality of candidates of learning data to train different identification devices; and a selection unit (124) configured to select one or more pieces of learning data from the plurality of candidates of learning data, based on identification performance of a plurality of trained identification devices (a, b, c, A, B) that have been trained by the learning unit (130, 140).

Note 5

The data generation apparatus according to Note 4, wherein the selection unit (124) is configured to select the one or more pieces of learning data from the plurality of candidates of learning data based on a degree of similarity between a region before correction performed by the correction unit (123) and a region after correction performed by the correction unit (123).

Note 6

The data generation apparatus according to Note 5, wherein the selection unit (124) is configured to calculate the degree of similarity based on the correlation between pixel values of pixels at an outer edge of a region before correction performed by the correction unit (123) and pixel values of pixels at an outer edge of a region after correction performed by the correction unit (123).

Note 7

The data generation apparatus according to any one of Notes 1 to 6, wherein the acquisition unit (153, 170, 180) is configured to acquire an image of an object to be inspected including a plurality of defects, and a plurality of regions that respectively include the plurality of defects included in the image, the correction unit (123) is configured to correct each of the plurality of regions acquired by the acquisition unit (153, 170, 180) such that an outer edge of the region is expanded so as to increase the number of pixels included in the region by a predetermined amount, and the generation unit (121) is configured to generate learning data by associating the plurality of regions corrected by the correction unit with the image.

Note 8

The data generation apparatus according to any one of Notes 1 to 7, further including an input unit (170, 180) configured to accept input of information to designate a region of the image that includes the defect, wherein the acquisition unit (153, 170, 180) is configured to acquire a region of the image that includes the defect based on information input to the input unit (170, 180).

Note 9

The data generation apparatus according to Note 8, wherein the input unit (170, 180) is configured to accept input of one or more points of the image to designate points inside a region of the image that includes the defect.

Note 10

The data generation apparatus according to Note 9, wherein the points inside a region include an end point of the defect included in the image.

Note 11

The data generation apparatus according to any one of Notes 8 to 10, wherein the input unit (170, 180) is configured to accept input of one or more points of the image to designate an outer shape of a region of the image that includes the defect.

Note 12

The data generation apparatus according to any one of Notes 8 to 10, wherein the correction unit (123) is configured to correct the region such that the outer edge of the region shrinks, when a predetermined condition is satisfied.

Note 13

The data generation apparatus according to any one of Notes 8 to 10, wherein the correction unit (123) is configured to determine an enlarging/shrinking rate of the outer edge of the region based on an area ratio between the defect and the other portion included in a region acquired by the acquisition unit (153, 170, 180).

Note 14

A data generation method including;

acquiring an image of an object to be inspected including a defect, and a region of the image that includes the defect;

correcting the acquired region such that an outer edge of the region is expanded so as to increase the number of pixels included in the region by a predetermined amount; and generating learning data by associating the corrected region with the image.

Note 15

A data generation program for causing a computation apparatus included in a data generation apparatus (100) to function as;

an acquisition unit (153, 170, 180) configured to acquire an image of an object to be inspected including a defect, and a region of the image that includes the defect;

a correction unit (123) configured to correct a region acquired by the acquisition unit (153, 170, 180) such that an outer edge of the region is expanded so as to increase the number of pixels included in the region by a predetermined amount; and a generation unit (121) configured to generate learning data by associating the region corrected by the correction unit with the image.

The invention claimed is:

1. A data generation apparatus comprising a processor configured with a program to perform operations comprising:

operation as an acquisition unit configured to acquire an image of an object to be inspected including a defect in the object to be inspected, and a region of the image that includes the defect and a part of the region not including the defect;

operation as a correction unit configured to correct the region acquired by the acquisition unit by expanding an outer edge of the region so that a number of pixels included in the part of the region not including the defect is increased by a predetermined amount, such that a size of the part of the region not including the defect increases; and operation as a generation unit configured to generate learning data by associating the region corrected by the correction unit with the image and comparing the part of the region not including the defect to that including the defect.

2. The data generation apparatus according to claim 1, wherein the processor is configured with the program such that:

operation as the correction unit comprises performing a plurality of different corrections on the region acquired by the acquisition unit, and operation as the generation unit comprises associating, with the image, a plurality of corrected regions obtained by the correction unit performing the plurality of different corrections on the region, and generating a plurality of candidates of learning data corresponding to the plurality of different corrections performed by the correction unit.

3. The data generation apparatus according to claim 1, wherein the processor is configured with the program such that operation as the correction unit comprises determining a correction method for the region based on a background pattern of the region acquired by the acquisition unit other than the defect.

4. The data generation apparatus according to claim 2, wherein the processor is configured with the program to perform operations further comprising:

operation as a learning unit configured to train a plurality of identification devices that identify whether or not the object to be inspected includes a defect based on an input image, by respectively applying the plurality of candidates of learning data to train different identification devices; and operation as a selection unit configured to select one or more pieces of learning data from the plurality of candidates of learning data, based on identification performance of a plurality of trained identification devices that have been trained by the learning unit.

5. The data generation apparatus according to claim 4, wherein the processor is configured with the program such that operation as the selection unit comprises selecting the one or more pieces of learning data from the plurality of candidates of learning data based on a degree of similarity between the region before correction performed by the correction unit and the region after correction performed by the correction unit.

6. The data generation apparatus according to claim 5, wherein the processor is configured with the program such that operation as the selection unit comprises calculating the degree of similarity based on a correlation between pixel values of pixels at an outer edge of the region before correction performed by the correction unit and pixel values of pixels at an outer edge of the region after correction performed by the correction unit.

7. The data generation apparatus according to claim 1, wherein the processor is configured with the program such that:
   operation as the acquisition unit comprises acquiring an image of an object to be inspected including a plurality of defects, and a plurality of regions that respectively include the plurality of defects included in the image and parts of the regions not including the defects,
   operation as the correction unit comprises correcting each of the plurality of regions acquired by the acquisition unit by expanding outer edges of the regions so that numbers of pixels included in the regions are increased by a predetermined amount, and
   operation as the generation unit comprises operation as the generation unit configured to generate learning data by associating the plurality of regions corrected by the correction unit with the image and comparing the parts of the regions not including the defect to those including the defects.

8. The data generation apparatus according to claim 1, wherein
   the processor is configured with the program to perform operations further comprising operation as an input unit configured to accept input of information to designate the region of the image that includes the defect, and
   the processor is configured with the program such that operation as the acquisition unit comprises acquiring the region of the image that includes the defect based on the accepted input of information.

9. The data generation apparatus according to claim 7, wherein the processor configured with the program to perform operations further comprising operation as an input unit configured to accept input of one or more points of the image to designate points inside the region of the image that includes the defect.

10. The data generation apparatus according to claim 9, wherein the points inside a region include an end point of the defect included in the image.

11. The data generation apparatus according to claim 8, wherein the processor is configured with the program such that operation as the input unit comprises accepting input of one or more points of the image to designate an outer shape of the region of the image that includes the defect.

12. The data generation apparatus according to claim 8, wherein the processor is configured with the program such that operation as the correction unit comprises correcting the region such that an outer edge of the region shrinks in response to a predetermined condition being satisfied.

13. The data generation apparatus according to claim 8, wherein the processor is configured with the program such that operation as the correction unit comprises determining an enlarging/shrinking rate of the outer edge of the region based on an area ratio between the defect and the normal part included in the region acquired by the acquisition unit.

14. The data generation apparatus according to claim 2, wherein the processor is configured with the program such that operation as the correction unit comprises determining a correction method for the region based on a background pattern of the region acquired by the acquisition unit other than the defect.

15. The data generation apparatus according to claim 2, wherein the processor is configured with the program such that:
   operation as the acquisition unit comprises acquiring an image of an object to be inspected including a plurality of defects, and a plurality of regions that respectively include the plurality of defects included in the image and parts of the regions not including the defects,
   operation as the correction unit comprises correcting each of the plurality of regions acquired by the acquisition unit by expanding outer edges of the regions so that numbers of pixels included in the regions are increased by a predetermined amount, and
   operation as the generation unit comprises operation as the generation unit configured to generate learning data by associating the plurality of regions corrected by the correction unit with the image and comparing the parts of the regions not including the defects to those including the defects.

16. The data generation apparatus according to claim 2, wherein the processor is further configured with the program to perform operations comprising operation as an input unit configured to accept input of information to designate the region of the image that includes the defect, and
   the processor is configured with the program such that operation as the acquisition unit comprises acquiring the region of the image that includes the defect based on the accepted input of information.

17. A data generation method comprising:
   acquiring an image of an object to be inspected including a defect in the object to be inspected, and a region of the image that includes the defect and a part of the region not including the defect;
   correcting the acquired region by expanding an outer edge of the region so that a number of pixels included in the part of the region not including the defect is increased by a predetermined amount, such that a size of the part of the region no including the defect increases; and
   generating learning data by associating the corrected region with the image and comparing the part of the region not including the defect to that including the defect.

18. A non-transitory computer-readable storage medium storing a data generation program for causing a processor included in a data generation apparatus to perform operations comprising:
   operation as an acquisition unit configured to acquire an image of an object to be inspected including a defect in the object to be inspected, and a region of the image that includes the defect and a part of the region not including the defect;
   operation as a correction unit configured to correct the region acquired by the acquisition unit by expanding an outer edge of the region so that a number of pixels included in the part of the region not including the defect is increased by a predetermined amount, such that a size of the part of the region not including the defect increases; and operation as a generation unit configured to generate learning data by associating the region corrected by the correction unit with the image and comparing the part of the region not including the defect to that including the defect.

* * * * *